(12) United States Patent  
Wippler

(10) Patent No.: US 9,008,874 B2  
(45) Date of Patent: Apr. 14, 2015

(54) SYSTEM AND METHOD FOR MANAGING POWER IN A VEHICLE

(75) Inventor: Erik Anthony Wippler, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 250 days.

(21) Appl. No.: 13/014,541

(22) Filed: Jan. 26, 2011

(65) Prior Publication Data

US 2012/0191279 A1    Jul. 26, 2012

(51) Int. Cl.  
*B60L 11/00*    (2006.01)  
*G06F 17/00*    (2006.01)  
(Continued)

(52) U.S. Cl.  
CPC .......... *B60L 15/2045* (2013.01); *H02J 7/0047* (2013.01); *B60W 50/0097* (2013.01); *B60W 50/14* (2013.01); *B60L 1/003* (2013.01); *B60L 1/02* (2013.01); *B60L 1/14* (2013.01); *B60L 11/14* (2013.01); *B60L 11/1859* (2013.01); *B60L 11/1861* (2013.01); *B60W 10/30* (2013.01); *B60W 2050/146* (2013.01); *Y02T 10/84* (2013.01); *B60L 2240/34* (2013.01); *B60L 2240/622* (2013.01); *B60L 2240/642* (2013.01); *B60L 2240/647* (2013.01); *B60L 2250/16* (2013.01); *B60L 2250/18* (2013.01); *B60L 2260/52* (2013.01); *B60L 2260/54* (2013.01); *B60L 2240/645* (2013.01); *Y02T 10/7077* (2013.01); *Y02T 10/7044* (2013.01); (Continued)

(58) Field of Classification Search  
CPC ...... B60R 16/0236; G01F 9/023; G01F 9/001  
USPC .............. 701/22, 123; 702/60–63; 340/636.1, 340/439; 903/903, 907  
See application file for complete search history.

(56) References Cited

U.S. PATENT DOCUMENTS 2,790,961 A    4/1957  Del Camp  
4,447,030 A    5/1984  Nattel  
(Continued)

FOREIGN PATENT DOCUMENTS

DE    3824301 A1    2/1990  
EP    0652621 A2    5/1995  
(Continued)

OTHER PUBLICATIONS

Avaya, 2400 Series Digital Telephones, www.avaya.com/gcm/master-usa/en-us/products/offers/2400_series_digital_telephon . . . Feb. 24, 2009.

*Primary Examiner* — Jack W Keith  
*Assistant Examiner* — Chuong P Nguyen  
(74) *Attorney, Agent, or Firm* — Gifford, Krass, Sprinkle, Anderson & Citkowski, P.C.

(57) ABSTRACT

A system and method for managing power in a vehicle is provided herein. The vehicle includes a battery, an electric motor, and a plurality of electric devices. The electric motor is operable to drive the vehicle. The battery provides power to the electric motor and each of the electric devices. A first sensor is operable to detect the amount of power each of the electric devices is consuming and a display is operable to provide the power consumption for each of the electric devices and the battery power. Accordingly, the user is able to identify and manage how the battery's power is being distributed during the operation of the vehicle.

18 Claims, 5 Drawing Sheets

(51) Int. Cl.
  *B60L 15/20* (2006.01)
  *H02J 7/00* (2006.01)
  *B60W 50/00* (2006.01)
  *B60W 50/14* (2012.01)
  *B60L 1/00* (2006.01)
  *B60L 1/02* (2006.01)
  *B60L 1/14* (2006.01)
  *B60L 11/14* (2006.01)
  *B60L 11/18* (2006.01)
  *B60W 10/30* (2006.01)

(52) U.S. Cl.
  CPC ............ *Y02T 10/7005* (2013.01); *Y02T 10/705* (2013.01); *Y02T 90/16* (2013.01); *Y02T 90/162* (2013.01); *Y10S 903/903* (2013.01); *Y10S 903/907* (2013.01)

(56) References Cited

U.S. PATENT DOCUMENTS

| | | | |
|---|---|---|---|
| 4,546,850 A | 10/1985 | Litner | |
| 4,742,978 A | 5/1988 | Ponticelli | |
| 4,874,224 A | 10/1989 | Gutman et al. | |
| 4,964,048 A | 10/1990 | Tanaka et al. | |
| 5,104,071 A | 4/1992 | Kowalski | |
| 5,261,349 A | 11/1993 | Iino et al. | |
| 5,528,720 A | 6/1996 | Winston et al. | |
| 5,534,759 A * | 7/1996 | Evans et al. | 318/139 |
| 5,676,338 A | 10/1997 | Warda et al. | |
| 5,694,793 A | 12/1997 | Nishimura et al. | |
| 5,778,326 A * | 7/1998 | Moroto et al. | 701/22 |
| 5,832,396 A | 11/1998 | Moroto et al. | |
| 6,142,427 A | 11/2000 | Kogure et al. | |
| 6,154,081 A | 11/2000 | Pakkala et al. | |
| 6,229,090 B1 | 5/2001 | Kawaguchi et al. | |
| 6,335,861 B1 | 1/2002 | Ramsey, III et al. | |
| 6,357,881 B1 | 3/2002 | Robertson | |
| 6,364,394 B1 | 4/2002 | Davis, Jr. et al. | |
| 6,371,433 B2 | 4/2002 | Anderson et al. | |
| 6,603,083 B2 | 8/2003 | Amari et al. | |
| 6,838,858 B2 * | 1/2005 | Berneis et al. | 320/135 |
| 6,932,310 B1 | 8/2005 | Diss | |
| 7,117,964 B1 | 10/2006 | Kuang et al. | |
| 7,145,442 B1 * | 12/2006 | Wai | 340/438 |
| 7,155,026 B2 | 12/2006 | Augustin, Sr. et al. | |
| 7,197,390 B2 | 3/2007 | Yuan et al. | |
| 7,521,935 B2 * | 4/2009 | Uchida | 324/426 |
| 7,576,915 B2 | 8/2009 | Kurt | |
| 7,710,073 B2 | 5/2010 | Yamauchi et al. | |
| 7,774,109 B2 | 8/2010 | Bajwa | |
| 7,853,816 B2 * | 12/2010 | Tanaka | 713/323 |
| 7,874,689 B2 | 1/2011 | Tane et al. | |
| 7,876,489 B2 | 1/2011 | Gandhi et al. | |
| 7,880,597 B2 * | 2/2011 | Uchida | 340/439 |
| 8,032,317 B2 * | 10/2011 | Houston et al. | 702/62 |
| 8,412,476 B2 * | 4/2013 | Kato | 702/63 |
| 2004/0090195 A1 | 5/2004 | Motsenbocker | |
| 2004/0135547 A1 * | 7/2004 | Eifert et al. | 320/132 |
| 2004/0181323 A1 | 9/2004 | Yuan et al. | |
| 2005/0169003 A1 | 8/2005 | Lindahl et al. | |
| 2007/0029974 A1 * | 2/2007 | Uchida | 320/132 |
| 2007/0208468 A1 | 9/2007 | Sankaran et al. | |
| 2007/0233332 A1 | 10/2007 | Kawada et al. | |
| 2008/0151531 A1 | 6/2008 | Richardson et al. | |
| 2009/0040033 A1 * | 2/2009 | Uchida | 340/439 |
| 2009/0046453 A1 | 2/2009 | Kramer | |
| 2009/0168319 A1 | 7/2009 | Jeon et al. | |
| 2009/0174682 A1 | 7/2009 | Bowden et al. | |
| 2009/0243827 A1 | 10/2009 | Burke et al. | |
| 2009/0303695 A1 | 12/2009 | Buchstab et al. | |
| 2010/0073158 A1 * | 3/2010 | Uesaka et al. | 340/450.2 |
| 2010/0090962 A1 | 4/2010 | Yoo et al. | |
| 2010/0110027 A1 | 5/2010 | Lipman et al. | |
| 2010/0121590 A1 * | 5/2010 | Kato | 702/63 |
| 2010/0156657 A1 | 6/2010 | Lee et al. | |
| 2010/0188193 A1 | 7/2010 | Uken et al. | |
| 2010/0299010 A1 * | 11/2010 | Balmy | 701/22 |
| 2010/0299012 A1 * | 11/2010 | Kozarekar | 701/22 |
| 2011/0309926 A1 * | 12/2011 | Eikelenberg et al. | 340/439 |
| 2012/0075090 A1 * | 3/2012 | Satake et al. | 340/455 |
| 2012/0143410 A1 * | 6/2012 | Gallagher et al. | 701/22 |
| 2012/0179395 A1 * | 7/2012 | Gilman et al. | 702/61 |
| 2013/0127475 A1 | 5/2013 | Sitarski et al. | 324/435 |
| 2013/0278054 A1 * | 10/2013 | Kritt et al. | 307/10.1 |
| 2014/0074329 A1 * | 3/2014 | Yang et al. | 701/22 |

FOREIGN PATENT DOCUMENTS

| | | | | |
|---|---|---|---|---|
| EP | 0713101 A2 | | 5/1996 | |
| EP | 0831249 A2 | | 3/1998 | |
| JP | 2000194484 A | | 7/2000 | |
| JP | 2001282410 A | | 10/2001 | |
| JP | 2006115623 A | * | 4/2006 | B60L 15/20 |
| WO | WO-2006057889 A2 | | 6/2006 | |
| WO | WO-2010029315 A2 | | 3/2010 | |

\* cited by examiner

SYSTEM AND METHOD FOR MANAGING POWER IN A VEHICLE

FIELD OF THE INVENTION

The present invention relates to a system and method for managing power in a vehicle having an electric motor and a plurality of electric devices. The system is operable to provide the power consumption of each of the electric devices and the battery power so that the user may adjust power usage to achieve a desired vehicle performance.

BACKGROUND OF THE INVENTION

Vehicles driven by electric motors are currently known. The electric motor is commonly powered by a battery. In some instances the vehicle is driven by both the electric motor and an internal combustion engine. The electric motor and internal combustion engine are coupled to a transfer case which is mechanically coupled to the vehicle's drive train. The transfer case is operable to receive power from both the electric motor and the internal combustion engine so as to actuate the drive train and move the vehicle.

The battery may be further operable to provide power to various electric devices within the vehicle such as the vehicle's navigation system, radio, and other multimedia devices. Other electric devices such as the headlamps or air conditioning and heating components of the vehicle may also be powered by the battery. Thus, the operation of such electric devices may draw power from the battery which would otherwise be available to move the vehicle.

Current hybrid or electric vehicles do not have systems which provide notice to the driver as to the amount of power being drawn from the battery by the vehicle's electric devices. Thus drivers are not able to easily know how the operation of such electric devices may affect the availability of the battery's power output. Accordingly, drivers may not easily adjust the operation of such electric devices to optimize the battery's power. Thus, it remains desirable to have a system and method for managing power in the vehicle so as to provide the driver with options for managing the battery's power.

SUMMARY OF THE INVENTION

The present invention provides a system and method for managing power in a vehicle. The vehicle includes a battery, an electric motor, and a plurality of electric devices. The electric motor is operable to drive the vehicle. The battery provides power to the electric motor and each of the electric devices.

A first sensor is operable to detect the amount of power each of the electric devices is consuming. A display is operable to provide the power consumption for each of the electric devices and the battery power. Accordingly, the user is able to identify how the battery's power is being distributed during the operation of the vehicle. This knowledge may be used to turn off certain electric devices which may draw power from the battery that would otherwise be used to drive the vehicle.

The system further includes a processor in communication with the battery and the first sensor. The processor is operable to process the amount of power available in the battery and the amount of power used by the electric devices to calculate a maximum driving range. The maximum driving range indicates the distance the vehicle may travel based upon the amount of power left in the battery and the amount of power used by the electric devices.

The processor may automatically recalculate the maximum driving range when an electric device is either turned off or the power consumption by the device is increased or decreased. The processor may be further operable to calculate a plurality of maximum ranges. Each of the plurality of maximum ranges is based upon the use of one or more of the electric devices. For instance, the processor may be able to calculate a maximum range which indicates the maximum distance of the vehicle driven by the electric motor when the radio is turned off and the headlights are on. In another instance the processor may be able to provide and calculate a maximum range indicating the maximum distance the vehicle may drive based upon the use of the headlights and the air conditioning system of the vehicle.

The system may further include an input. The input is operable to select one of the plurality of maximum driving ranges and the processor is operable to actuate the electric devices to achieve the selected maximum driving ranges.

The system may further include a database operable to store the driving habits of the user. The processor is in further communication with the database and is operable to process the amount of available power in the battery, the amount of power used by the electric devices, and the user's driving habits to calculate the maximum driving range.

The maximum driving range may be further based upon the driving habits of the user as well as the current load distribution of the battery. For instance, a user who tends to accelerate the vehicle at a greater rate of speed than another user will have a maximum driving range which is less than the other user. The processor is further operable to calculate the plurality of maximum ranges based upon the use of one or more of the electric devices and the driving habits of the user.

The system may further include a navigation system operable to detect the vehicle's current location, store a selected destination, and provide a route from the vehicle's current location and the selected destination. The navigation system may be further operable to provide geographical and road information related to the route. The processor is further operable to calculate a plurality of maximum ranges based upon the use of the electric devices, the driving habits of the user, and the current location and the geographical and road information related to the route.

The display may be mounted on the dashboard of the vehicle and may further include a plurality of icons. Each icon represents one of the plurality of electric devices and is displayed on the display. The icons may further include a meter. The meter is operable to show how much power the electric device is using. Thus with a quick glance the user may look at the display to determine the power distribution and adjust the distribution of power accordingly.

A method for managing power in a vehicle is also provided. The method includes the step of detecting the amount of power each of the electric devices is consuming and displaying the power consumption of the electric devices and the battery power. The method may further include the step of calculating a maximum driving range. The maximum driving range provides an estimation of the distance the vehicle may travel based upon the amount of power left in the battery, the amount of power used by the electric devices, and the driving habits of the user.

The method may further include the step of calculating a plurality of maximum ranges. Each of the maximum ranges is based upon the use of one or more of the electric devices.

The method may further include the step of detecting the vehicle's current location and selecting a destination so as to provide a route from the vehicle's current location and the selected destination and gathering geographical and road information related to the route. The method may further include calculating the maximum range or the plurality of driving conditions based upon the use of the electric devices, the driving habits of the user, and the information related to the route.

The method may further include the steps of providing a plurality of icons representing each of the electric devices and displaying the icons on the display. The method may further include the step of providing a meter showing how much power each of the electric devices is using. Thus, the method provides a relatively simple way for drivers to manage power distribution in the vehicle.

DETAILED DESCRIPTION OF THE INVENTION

Figure 1:
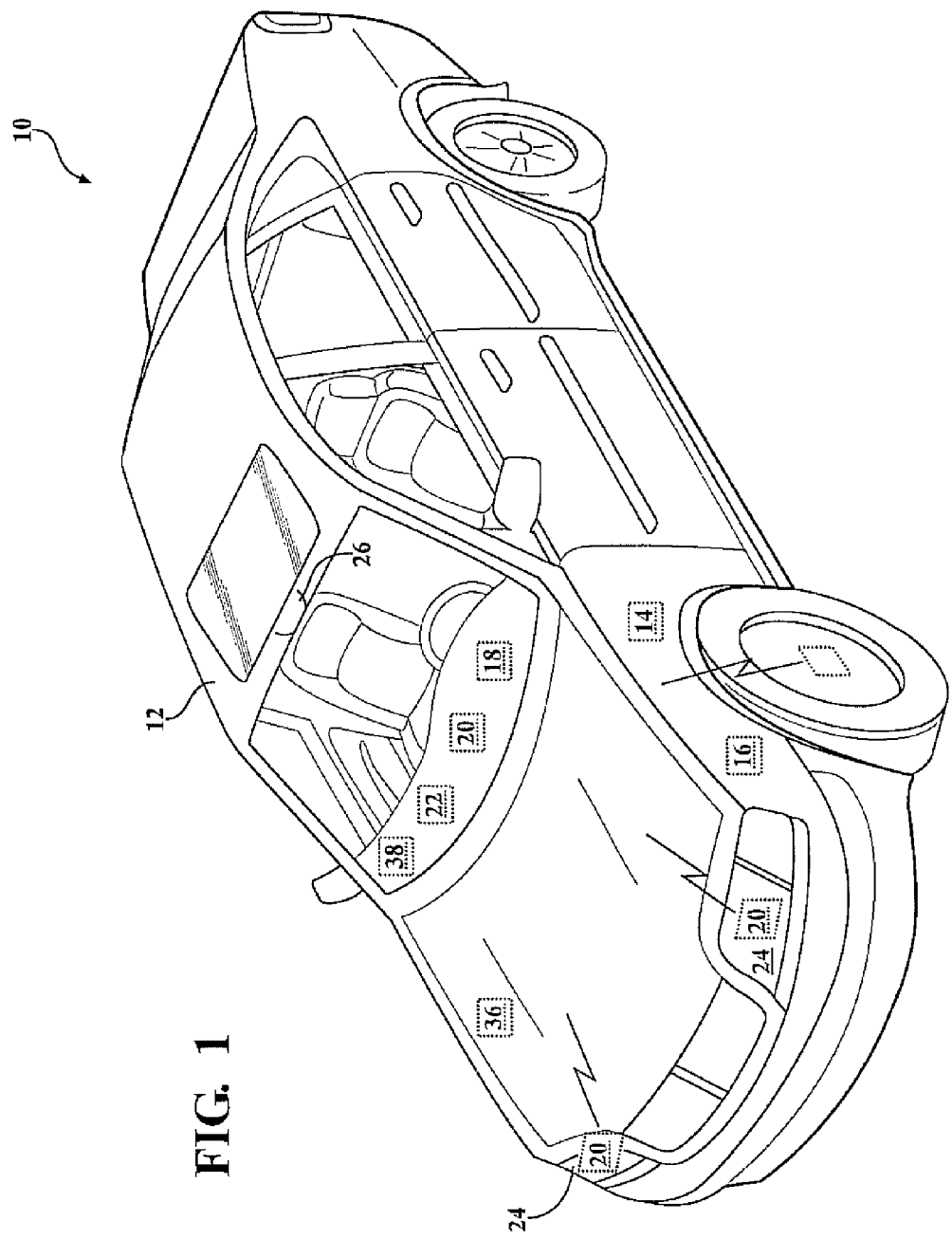
FIG. 1, is a system for managing power in a vehicle is provided.
Figure 2:
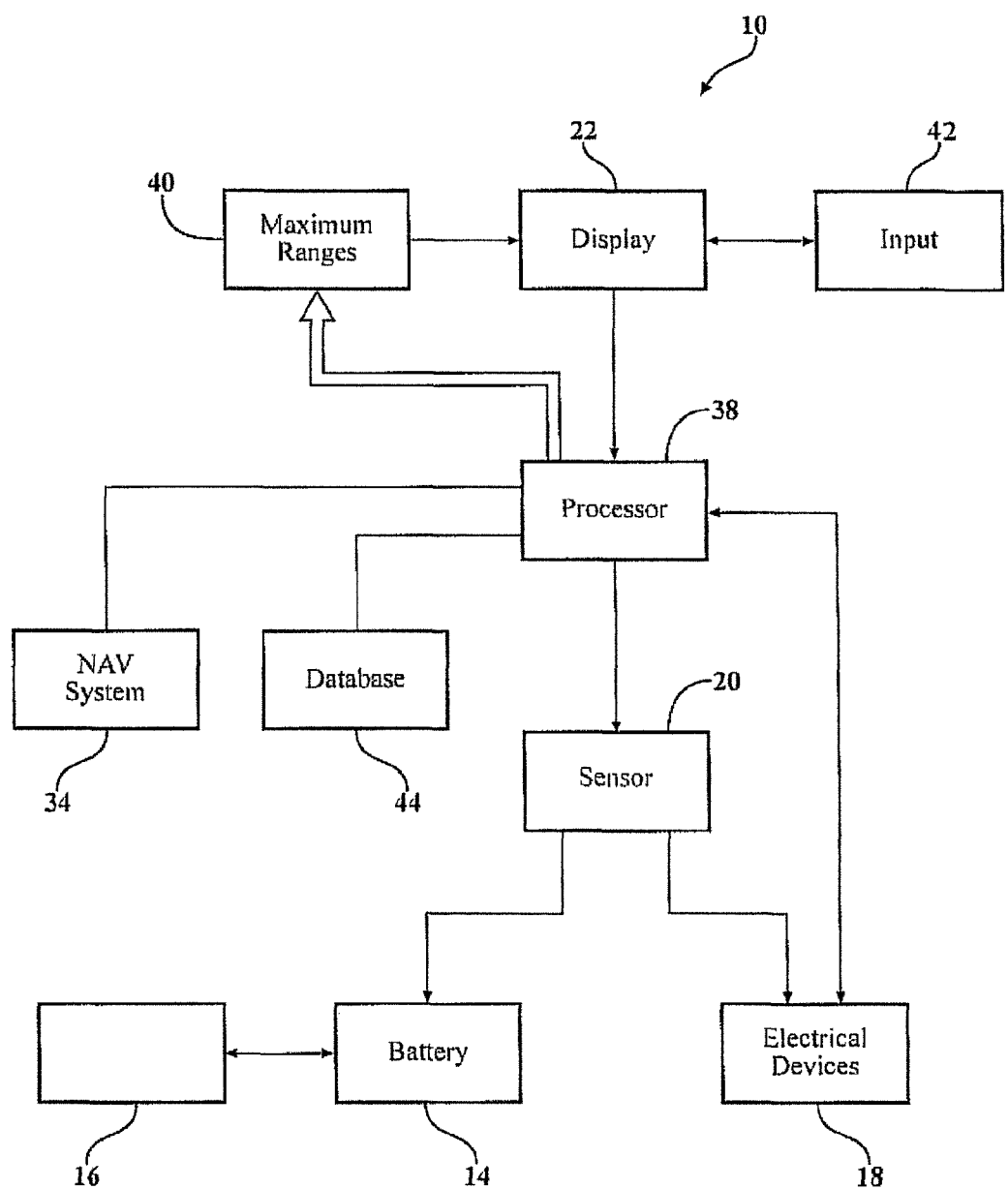
FIG. 2 is a diagram showing a system for managing power in a vehicle.
Figure 3:
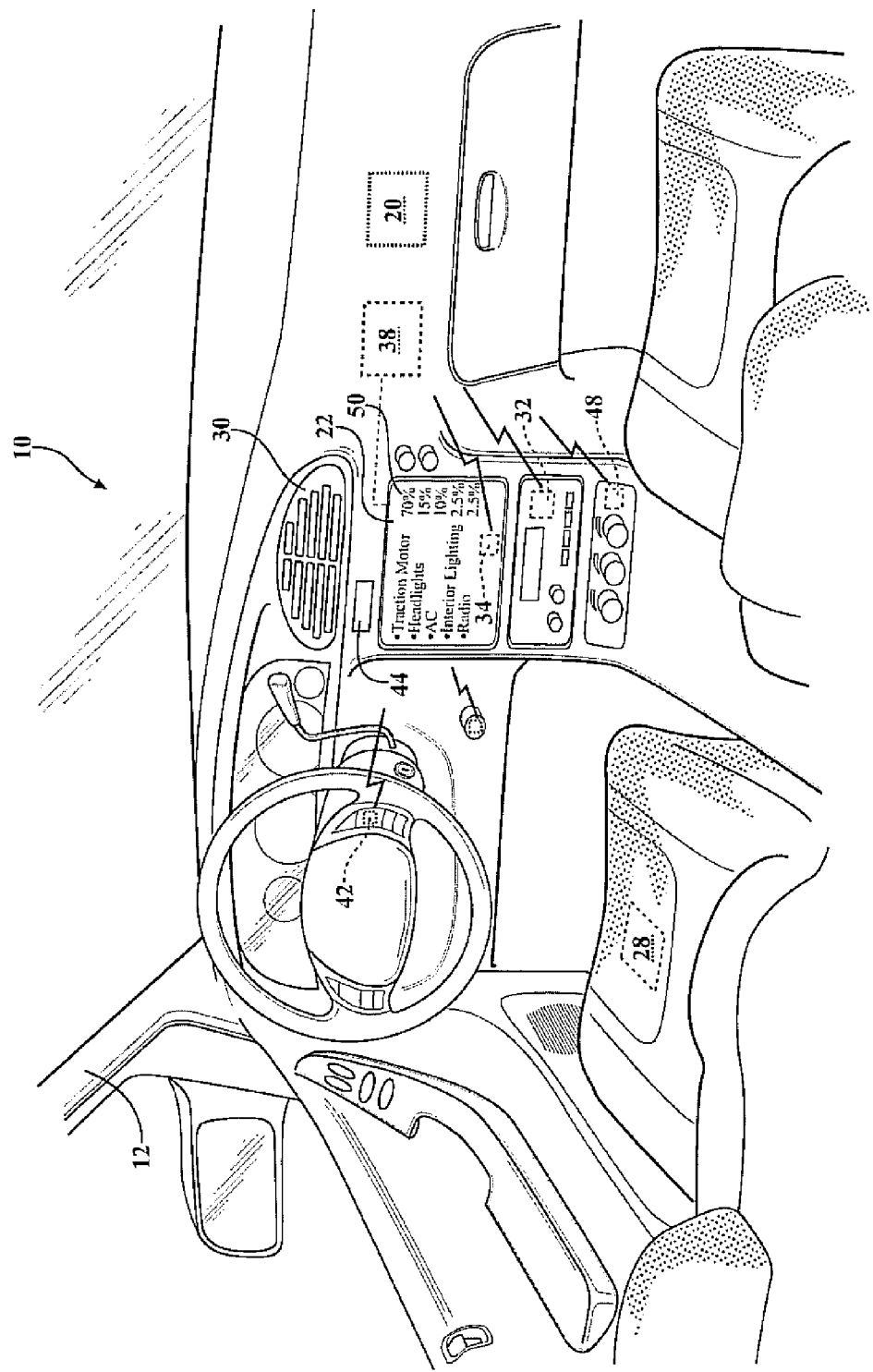
FIG. 3 is perspective view of a display for use in the system shown in FIG. 1.

With reference first to FIGS. 1 and 2, a system 10 for managing power in a vehicle 12 is provided. The vehicle 12 includes a battery 14, an electric motor 16, and a plurality of electric devices 18. The battery 14 is operable to power the electric motor 16. The electric motor 16 is operable to drive the vehicle 12, and the battery 14 is further operable to power each of the electric devices 18.

The system 10 includes a sensor 20 and a display 22. The sensor 20 is configured to detect the amount of power each of the electric devices 18 is consuming. Any such sensor 20 currently known and used in the art may be adaptable for use herein, illustratively including a sensor unit having a plurality of sensors coupled to a bus in electrical communication with the electrical devices 18, and configured to detect the difference in load with respect to the electrical devices connected to the bus. The display 22 is configured to provide the power consumption of each of the electric devices 18 and the battery power. The electric devices 18 may include the vehicle's 12 headlamp assembly 24, interior lighting 26, seat heaters 28, air conditioning system 30, multimedia systems 32 such as a radio and DVD players, as well as the navigation system 34.

The vehicle 12 may include a secondary power source 36 for driving the vehicle 12 such as an internal combustion engine. As the vehicle 12 is being operated the sensor 20 detects the amount of power the electric devices 18 are consuming and shows the power consumption to the user. The display 22 also shows the power available in the battery 14.

The user may simply observe how power is being distributed throughout the vehicle 12 during vehicle 12 operations and may adjust power distribution by turning off, on, or adjusting the power supply to an electric device 18. For instance, the driver may turn down the radio volume, reduce the heat of the seat heater 28 or turn off the air conditioning in order to conserve battery power for vehicle propulsion. Alternatively, in instances where the user does not wish to conserve power, the user may elect to maintain the power distribution to selected electric devices 18 at its current rate. Thus the system 10 allows the driver to optimize the performance of the battery 14 by managing how the power is distributed.

Further, the system 10 provides a visual of power distribution so as to facilitate the management of power.

The system 10 may include a processor 38. The processor 38 is in communication with the battery 14 and the sensor 20. The processor 38 is operable to process the amount of power available in the battery 14. The processor 38 may also process the amount of power used by each of the electric devices 18 to calculate a maximum driving range.

The maximum driving range is based upon the current power use of the battery 14 and the current available power in the battery 14. The maximum driving range is a calculation indicating the estimated distance the vehicle 12 may travel based upon the amount of power left in the battery 14 and the current rate of power used by the electric devices 18.

Figure 4:
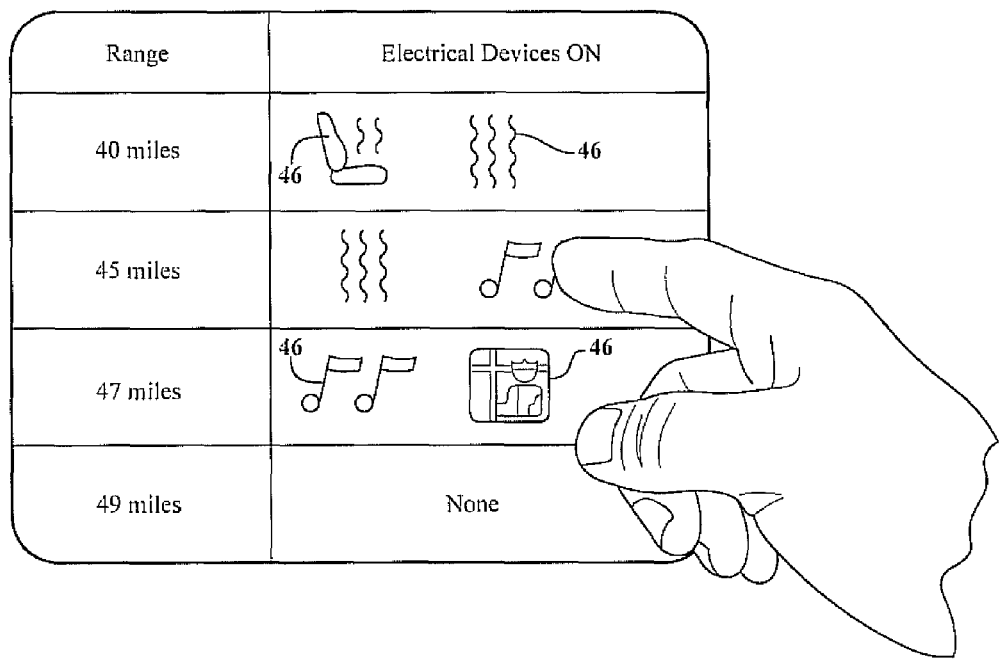
FIG. 4 is display showing a plurality of calculated maximum ranges.

With reference now to FIG. 4, the processor 38 may be operable to calculate a plurality of maximum ranges 40. The maximum ranges 40 may include the current maximum range 40 based upon current use and available power of the battery 14. Other maximum ranges 40 may be based upon the use of one or more of the electric devices 18. For instance, one of the plurality of maximum ranges 40 may be calculated based upon the use of the vehicle's 12 seat heater 28 whereas another maximum range 40 may be based upon the use of the vehicle's 12 headlamps.

The calculated maximum ranges 40 provide the driver with various options for power distribution, allowing the driver to optimize the power based upon the user's preference. For example, assuming that the vehicle 12 is being driven on a cold day where visibility is clear, one of the plurality of calculated the maximum ranges 40 may be provided based upon the actuation of the seat heater 28 and another of the plurality of calculated maximum ranges 40 may be provided based upon the use of the vehicle's 12 heater for the system 10. In such a case, the calculated maximum range 40 for the seat heater 28 may not be as long and far as the maximum range 40 of a heater used in a ventilation system. The user may then decide which of the calculated maximum ranges 40 is desirable and adjust the electric devices 18 accordingly. Thus, the system 10 enables the user to choose between a creature comfort and a desire to minimize the use of the vehicle's 12 auxiliary power such as an internal combustion engine.

The system 10 may further include an input 42. The input 42 may be mounted to the vehicle's 12 instrument panel or steering wheel. The input 42 is operable to select one of the plurality of calculated maximum ranges 40. The processor 38, processes the selected maximum range 40 and actuates the electric devices 18 accordingly. Thus, in a case where the user selects a calculated maximum range 40 wherein the seat heater 28 is turned off, the processer automatically turns the seat heater 28 off.

The system 10 may further include a database 44 operable to store the driving habits of a user. The processor 38 is in communication with the database 44. The driving habits of the user may be processed along with the amount of power available in the battery 14, the amount of power used by the electric devices 18 to calculate the maximum driving range.

The system 10 may include a navigation system 34 operable to provide a route. The navigation system 34 detects the vehicle's 12 current location, stores a selected destination and provides a route from the vehicle's 12 current location and selected destination. The navigation system 34 may gather geographical and road information related to the route. The processor 38 may process the route information to calculate the plurality of maximum ranges 40 and optimal driving conditions.

Thus, in instances where the vehicle 12 must ascend a hill during its route, the ascension of the hill naturally will draw more power from the battery 14 and maintaining the vehicle 12 solely under the battery power may not be feasible when one or more of the electric devices 18 are being actuated. Thus maximum ranges 40 may be further when the vehicle 12 is not operating with its heaters on and its radio turned up. This information may be used by the user to determine whether or not such electric devices 18 need to be actuated based upon the user's desires or need to reserve battery power for travel.

The electric devices 18 may be represented by an icon 46. For instance, the audio system 10 may be shown as a musical note. An icon 46 showing a seat having vapors emanating therefrom may indicate the seat heater 28. An icon 46 such as a snowflake may indicate the vehicle's 12 air conditioning unit 48. These icons 46 may be illuminated when the respective electric device 18 is actuated.

A meter 50 may be disposed adjacent the icon 46. The meter 50 indicates how much electric power the device is using. The meter 50 may be shown in a percentage of the amount of power used with respect to the total power available or may be provided in kilowatts per hour to allow the user to see how much power is being drawn by the actuation of the respective electric device 18. Thus, the user may adjust certain electric devices 18 or keep certain devices 18, 52 turned off while driving so as to maintain sufficient power to drive the vehicle 12 under the electric motor 16.

Figure 5:
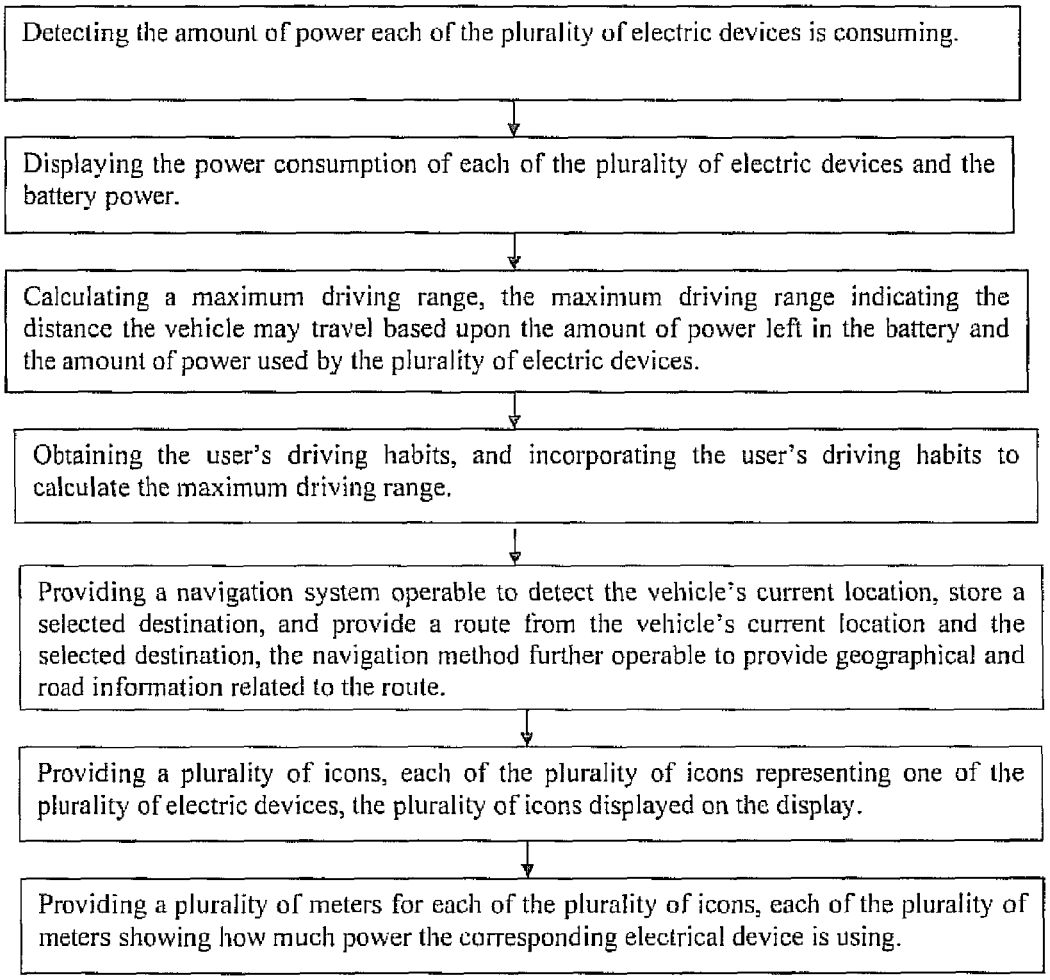
FIG. 5 is a diagram showing a method for managing power in a vehicle.

With reference now to FIG. 5, a flowchart showing a method for managing power in a vehicle 12 is provided. The vehicle 12 includes a battery 14, an electric motor 16, and a plurality of electric devices 18. The electric devices 18 may illustratively include the seat heaters 28, air conditioning unit 48, headlamp, interior lighting 26, multimedia devices 18, 52, windshield wipers, and the like. The electric motor 16 is powered by the battery 14 as are the electric devices 18. The method includes the step of detecting the amount of power each of the electric devices 18 is consuming and displaying the power consumption of each of the electric devices 18 along with the battery power.

The method may further include the step of calculating a maximum driving range. The maximum driving range indicates the distance the vehicle 12 may travel based upon the amount of power left in the battery 14 and the amount of power used by the electric devices 18. The method may further include the step of calculating a plurality of maximum ranges 40. Each of the maximum ranges 40 is based upon the use of one or more of designated electric devices 18. For instance, one maximum range 40 may be based upon the use of the vehicle's 12 seat heater 28 and lamp assembly whereas another maximum range 40 may be based upon the use of the seat heater 28, lamp assembly, and multimedia component such as navigation or the radio.

The maximum ranges 40 may be based upon further inputs 42 such as the driver's habits and the geographical information related to a selected route. Thus the maximum range 40 may fluctuate between users and based upon a selected destination.

With reference again to FIG. 5, the method further includes the step of detecting the vehicle's 12 current location and selecting a destination so as to generate a route from the vehicle's 12 current location and selected destination. The geographical and road information related to the route is gathered and may be used to calculate the maximum ranges 40 and optimal driving conditions. The method may further include the step of providing a plurality of icons 46, each of the icons 46 representing one of the plurality of electric devices 18, and displaying these icons 46 on a display 22. The icons 46 may further include a meter 50, the meter 50 showing how much power the electric device 18 is using. Thus, the method provides a relatively simple way for drivers to manage power distribution in the vehicle 12.

The invention claimed is:

1. A system for managing power in a vehicle, the vehicle having a battery, an electric motor and a plurality of electric devices, the electric motor configured to drive the vehicle and the battery providing power to the electric motor and each of the plurality of electric devices, the system comprising:
    a sensor unit detecting the amount of power each of the plurality of electric devices is consuming;
    a processor in communication with the battery and the sense unit; and
    a display configured to show the percentage of battery power each of the plurality of electric devices is consuming and how much battery power is available to power the electric motor; and wherein the processor calculates a maximum driving range, wherein the maximum driving range is calculated using the amount of power each one of the plurality of electric devices is consuming detected by the sensor unit, the power demand of the electric motor and the amount of power left in the battery, and wherein the processor is further configured to automatically recalculate the maximum driving range when the operation of any one of the plurality of electric devices changes so as to provide a user with an updated estimated vehicle range based upon the operation of any one of the plurality of electric devices, the maximum driving range is displayed on the display.

2. The system as set forth in claim 1, wherein the processor is further configured to calculate a plurality of maximum driving ranges, wherein the driving ranges are calculated using the amount of power used by a selected one of the plurality of electric devices and the amount of power left in the battery so as to provide the user with an estimated vehicle range based upon the continued operation of the selected one of the plurality of electric devices.

3. The system as set forth in claim 2, further including an input, wherein each of the plurality of maximum ranges is based upon the use of at least two or more of the electric devices, and wherein the processor actuates each of the selected electric devices of the corresponding selected maximum range.

4. The system as set forth in claim 3, further including a database configured to store driving habits of the user, the processor in communication with the database and configured to process the amount of power available in the battery, the amount of power used by the plurality of electric devices, and the user's driving habits to calculate the maximum driving range.

5. The system as set forth in claim 4, wherein the processor is further configured to calculate a plurality of maximum ranges, wherein each of the plurality of maximum ranges is based upon the use of one or more of the electric devices and the driving habits of the user.

6. The system as set forth in claim 3, further including a plurality of icons, each of the plurality of icons representing one of the plurality of electric devices, the plurality of icons displayed on the display.

7. The system as set forth in claim 6, wherein each of the plurality of icons includes a meter, the meter showing how much power the electric device is using.

8. The system as set forth in claim 2, further including a navigation system configured to detect the vehicle's current location, store a selected destination, and provide a route from the vehicle's current location and the selected destination, the navigation system further configured to provide geographical and road information related to the route.

9. The system as set forth in claim 8, wherein each of the plurality of maximum ranges is based upon the use of one or more of the electric devices, the driving habits of the users, and the current location and the geographical and road information related to the route.

10. A method for managing power in a vehicle, the vehicle having a battery, an electric motor and a plurality of electric devices, the electric motor configured to drive the vehicle and the battery providing power to the electric motor and to each of the electric devices, the method comprising the steps of:
  detecting the amount of power each of the plurality of electric devices is consuming;
  displaying the percentage of battery power each of the plurality of electric devices is consuming and how much battery power is available to power the electric motor; and
  calculating a maximum driving range using the amount of power each one of the plurality of electric devices is consuming; the power demand of the electric motor and the amount of power left in the battery, and automatically recalculating the maximum driving range when the operation of any one of the plurality of electric devices changes so as to provide a user with an updated estimated vehicle range based upon the operation of any one of the plurality of electric devices; and displaying the maximum driving range on the display.

11. The method as set forth in claim 10, further including the step of calculating a plurality of maximum driving ranges, the each of the plurality of maximum driving ranges indicating the distance the vehicle may travel based upon the amount of power left in the battery and the amount of power used by a selected one or more of the plurality of electric devices.

12. The method as set forth in claim 11, further including the step of providing an input, the input configured to select one of the plurality of maximum ranges, and wherein the vehicle actuates the corresponding selected one or more of the plurality of electric devices when a maximum driving range is selected.

13. The method as set forth in claim 11, further comprising the step of processing the amount of power available in the battery, the amount of power used by the plurality of electric devices, and the user's driving habits to calculate the maximum driving range.

14. The method as set forth in claim 13, wherein the plurality of maximum ranges is based upon the use of one or more of the electric device and the driving habits of the user.

15. The method as set forth in claim 11, further including providing a navigation system configured to detect the vehicle's current location, store a selected destination, and provide a route from the vehicle's current location and the selected destination, the navigation method further configured to provide geographical and road information related to the route.

16. The method as set forth in claim 15, wherein each of the plurality of maximum ranges is based upon the use of one or more of the electric devices, the driving habits of the users, and the current location and the geographical and road information related to the route.

17. The method as set forth in claim 10, further including the step of providing a plurality of icons, each of the plurality of icons representing one of the plurality of electric devices, the plurality of icons displayed on the display.

18. The method as set forth in claim 17, wherein each of the plurality of icons includes a meter, the meter showing how much power the electric device is using.

* * * * *